US008427582B2

(12) United States Patent
Shimada

(10) Patent No.: US 8,427,582 B2
(45) Date of Patent: Apr. 23, 2013

(54) VIDEO PROCESSOR DEVICE AND VIDEO PROCESSING METHOD

(75) Inventor: Kenichi Shimada, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 13/291,754

(22) Filed: Nov. 8, 2011

(65) Prior Publication Data

US 2012/0127369 A1    May 24, 2012

(30) Foreign Application Priority Data

Nov. 18, 2010    (JP) .................................. 2010-257413

(51) Int. Cl.
*H04N 9/74*    (2006.01)

(52) U.S. Cl.
USPC .......................................... 348/584; 348/598

(58) Field of Classification Search .................. 348/584, 348/597–598, 625, 628–629, 553–555, 723, 348/725; 345/611, 613, 619, 204; 382/266, 382/199, 286; *H04N 9/74*
See application file for complete search history.

(56) References Cited

U.S. PATENT DOCUMENTS

| 5,317,287 | A | * | 5/1994 | Brown | .............................. | 331/57 |
| 5,331,292 | A | * | 7/1994 | Worden et al. | ................. | 331/1 A |
| 5,751,886 | A |   | 5/1998 | Komine | | |
| 8,223,167 | B2 | * | 7/2012 | Ogino et al. | ................... | 345/613 |

FOREIGN PATENT DOCUMENTS

| JP | 8-336113 A | 12/1996 |
| JP | 2000-350213 A | 12/2000 |

* cited by examiner

*Primary Examiner* — Trang U Tran
(74) *Attorney, Agent, or Firm* — Foley & Lardner LLP

(57) ABSTRACT

A video processor and method for swiftly detecting swaps occurring between links during transmission of images by the dual-link system. A first image combiner unit combines an image D1 of a first link as an odd-numbered image, with an image of a second link, to generate a first combination image. A second image combiner unit combines an image of a second link as an odd-numbered image, with the image of the first link to generate a second combination image. An edge detector unit detects the horizontal edge of the first combination image and the second combination image. A judgment unit compares the number of triple edges in the first combination image and second combination image, and judges the combination image having more triple edges as the error image. The triple edges contain three consecutive edges along the horizontal direction, and the rising edges and falling edges are arrayed alternately.

4 Claims, 11 Drawing Sheets

VIDEO PROCESSOR DEVICE AND VIDEO PROCESSING METHOD

CROSS-REFERENCE TO RELATED APPLICATIONS

The disclosure of Japanese Patent Application No. 2010-257413 filed on Nov. 18, 2010 including the specification, drawings, and abstract is incorporated herein by reference in its entirety.

BACKGROUND

The present invention relates to technology for detecting swaps that occur between links during image transmission by the dual-system.

In the field of image transmission, images are subdivided and then transmitted. Japanese Unexamined Patent Publication No. 2000-350213 and Japanese Unexamined Patent Publication No. Hei08 (1996)-336113 for example disclose systems for subdividing an image into field images (images in an odd-numbered line and images in an even-numbered line) and then transmitting these field images.

In digital monitors such as for liquid crystal panels, both JEITA (Japan Electronics and Information Technology Industries Association) and VESA (Video Electronics Standards Association) provide standardized technology for subdividing images contained within video, into images comprised of pixels in odd-numbered positions, and images comprised of pixels in even-numbered positions and transmitting these images in parallel (Chapter 6 in JEIDA-59-1999 Digital Monitor Interface Standards Version 1.0, "Data transmission standardization criteria 2a LVDS", Chapter 5 in VESA TV Panels Standard Version 1, Mar. 10, 2006, "LVDS Data/Color Mapping").

The transmission system established in the above standards is from hereon called the "dual-link system" in the following description. Moreover, images comprised of pixels in odd-numbered positions are called "odd images" and images comprised of pixels in even-numbered positions are called "even images".

Odd-numbered position pixels are pixels arrayed horizontally in odd-numbered pixel positions such as "First", "Third", "Fifth", etc. Even-numbered position pixels are pixels arrayed horizontally in even-numbered pixel positions such as "Second", "Fourth", "Sixth", etc.

An overview of transmitting images by the dual-link system using a single horizontal line as an example is described next while referring to FIG. 10. Here, "pixels" to which an odd number is attached indicate pixels in an odd-numbered position, and "pixels" to which an even-number is attached indicated pixels in an even-numbered position as shown in FIG. 10. The same nomenclature is utilized in each of the following drawings.

As shown in FIG. 10, image data in a single horizontal line comprised of a "pixel 1, pixel 2, pixel 3, . . . , pixel 6, . . . " is subdivided on the transmission side into odd images comprised of pixels in odd-numbered positions (pixel 1, pixel 3, pixel 5, . . . ) and even images comprised of pixels in even-numbered positions (pixel 2, pixel 4, pixel 6, . . . ). These odd pixels and even pixels are transmitted in parallel utilizing a link 1 and a link 2.

On the receiving side these odd images and even images transmitted by way of the link 1 and the link 2 are combined and restored to the original image.

In the drawing in FIG. 11, reference numerals have been added to the drawing 7.1 on page 32 of JEIDA-59-1999 Digital Monitor Interface Standards Version 1.0. FIG. 11 shows the structure of an LDI (LVDS Display Interface) that conforms to the dual-link system.

This interface transmits two-channel image data of 24 bits each (red, green, blue at 8 bits each on two-channels) 48 bits, and horizontal and vertical synchronization signals, and data enable signals on the transmitter side as serial data on an eight-channel LVDS signal. On the receiver side, the eight-channel LVDS transmission data is converted to parallel data, and output as two-channel image data (red, green, blue at 8 bits each on two-channels) 48 bits, and horizontal and vertical synchronization signals, and data enable signals.

A graphics controller 10 subdivides the image into odd images and even images and outputs them to the interface (solid arrow lines in FIG. 10). An LCD panel 20 combines the odd images and the even images that were sent from the interface (dotted line arrows in FIG. 10) and displays them.

SUMMARY

Correctly recombining the odd images and the even images transmitted by the dual-link system into the original image on the receiver side as shown in FIG. 10, requires understanding the interrelation between the odd images and even images, and the link 1 and the link 2.

As can be seen in the example in FIG. 10, after arranging for the transmission side to output the odd images to link 1, and output the even images to link 2; the receiving side receives images from link 1 as odd images and images from link 2 as even images, and then combines the images from link 1 and the images from link 2 so that satisfactory combination images can be obtained.

However, if the receiving side combines images from link 1 as even images, and the images from link 2 as odd images, then combining the images correctly will prove impossible even if the transmission side has output the odd images to link 1 and the even images to link 2.

However, the dual-link system standards do not specify which link among the two links will transmit the odd images and which link will transmit the even images. Also, the parameters on the transmission side chips, the transmission path chips, and the receiving side chips can usually be freely changed, so that correctly coupling the links between the transmission side, the transmission path, and the receiving side requires performing the troublesome task of matching the parameters on each chip with each other and so is a task where mistakes can occur. More specifically, this system has the problem that swap mistakes can occur in the links from the transmission chip to the receiving chip so that the link that should send odd images actually transmits even images, or a function block that should be inputted with odd images is actually inputted with even images.

There is a technique known in the related art for detecting whether or not a swap has occurred between links. In this technique for example, the receiving side generates and displays the combined image, and then checks whether there are any abnormalities in the displayed image. However this technique has the problem that the detection of a swap (errors) is slow.

In view of the above problems with the related art, the present invention has the object of providing technology for swiftly detecting swap (errors) between links that occur during transmission of images in the dual-link system.

One aspect of the present invention is a video processor device. This video processor device is comprised of a first image combiner unit, a second image combiner unit, an edge detector unit, and a judgment unit. The images that configure the video and that were subdivided into odd images comprised of pixels in odd-numbered positions in a horizontal direction, and even images comprised of pixels in even-numbered positions in a horizontal direction, and each transmitted over a first link and a second link by the dual-link system are inputted to this video processor device as first link images and second link images.

The first image combiner unit combines the odd images of the first link images, and the even images of the second link images to generate and output a first combination image.

The second image combiner unit combines the even images of the first link images, and the odd images of the second link images to generate and output a second combination image.

The edge detector unit detects the number of triple edges in the first combination image and the second combination image. The triple edge is configured from three horizontal edges arrayed consecutively in the horizontal direction. The rising edges and the falling edges of these three edges are alternately arrayed within the triple edge.

The judgment unit compares the number of triple edges in the first combination image and the second combination image, and decides that the second link images are odd images when the number of triple edges is larger in the first combination image, and decides that the first link images are the odd images when the number of triple edges is larger in the second combination image.

Another aspect of the present invention is a video processor device. This video processor device is comprised of a first image combiner unit, a second image combiner unit, an edge detector unit, and a judgment unit. The images that configure the video and that were subdivided into odd images comprised of pixels in odd-numbered positions, and even images comprised of pixels in even-numbered positions, and each transmitted over a first link and a second link by the dual-link system are inputted to this video processor device as first link images and second link images.

The first image combiner unit combines the odd images of the first link images, and the even images of the second link images to generate and output a first combination image.

The second image combiner unit combines the even images of the first link images, and the odd images of the second link images to generate and output a second combination image.

The edge detector unit detects horizontal edges in the first combination image and the second combination image.

In either of the combination images including a first combination image and a second combination image; the judgment unit decides that the other combination image is an error image when:

a triple edge of a first pattern was detected in one combination image in a section centering on a position in the other combination image that matches the position where a rising edge was detected between a pixel in an odd-numbered position, and a pixel on the right adjacent side of the applicable pixel and when:

a triple edge of a second pattern was detected in one combination image in a section centering on a position in the other combination image that matches the position where a falling edge was detected a pixel in an odd-numbered position, and a pixel on the right adjacent side of the applicable pixel.

The triple edge as already described is three consecutive horizontal edges arrayed in a horizontal direction, and with the rising edge pulses and falling edge pulses arrayed alternately.

The triple edge of the first pattern begins from the rising edge, and the triple edge of the second pattern begins from the falling edge.

The aspect of the present invention is also valid and applicable to devices expressing the video processor device of the above embodiment where substituted with other methods and systems; or programs for executing these video processor devices on a computer.

The technology of the present invention is capable of high-speed detection of swap (errors) occurring between the links during transmission of images by the dual-link system.

DETAILED DESCRIPTION

Before describing the specific embodiment of the present invention, the principle of the technology of this invention is first of all described while referring to FIG. 1 through FIG. 4.

Results of diligent research efforts by the present inventors into detecting swap (errors) occurring between links, revealed that there is a difference between the combination images when a swap has occurred and when a swap has not occurred.

Figure 1:
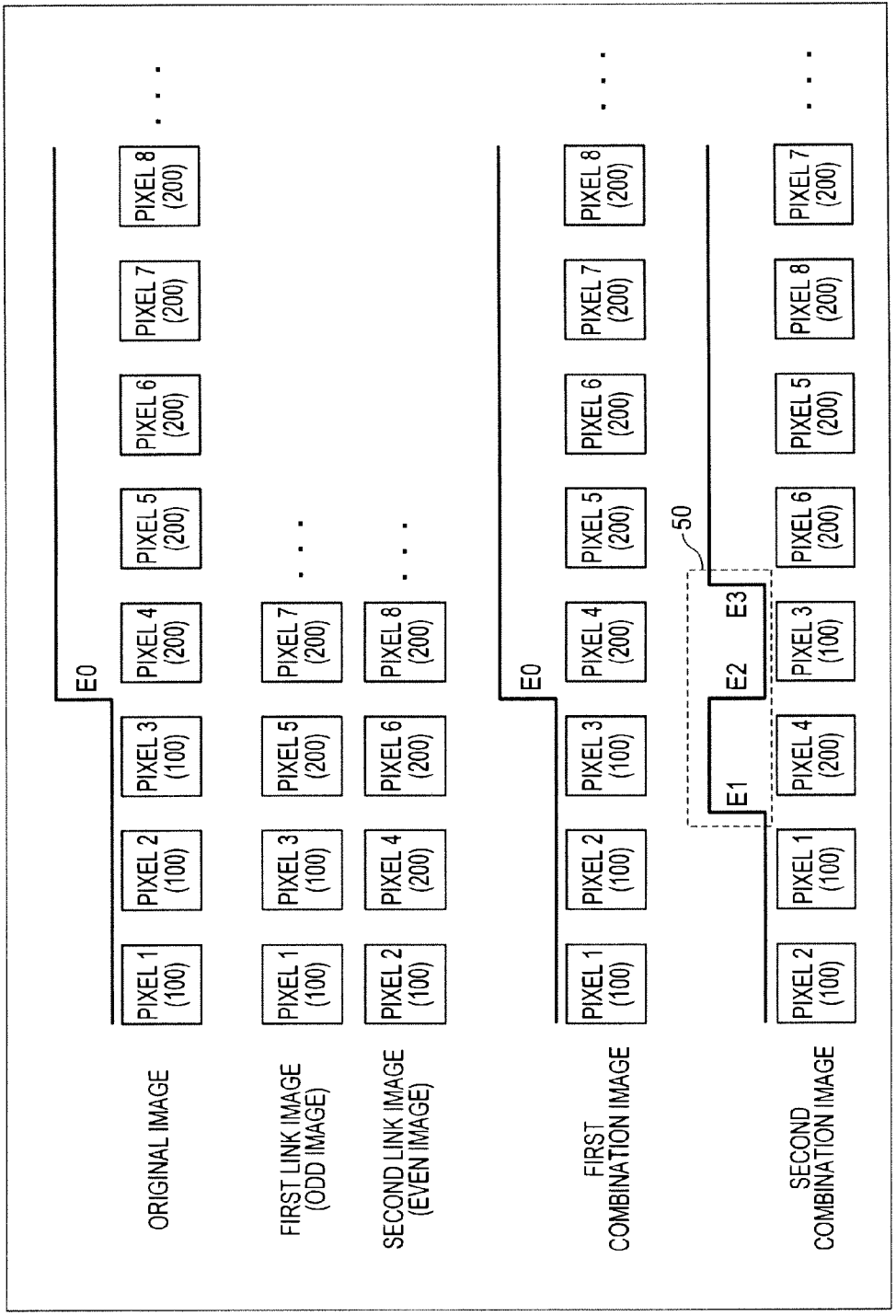
FIG. 1 is a drawing for describing the principle of the technology relating to the present invention (part 1)

FIG. 1 is a drawing for describing the difference in a single horizontal line of the image when a swap has occurred, and has not occurred, between links when the applicable image was transmitted by the dual-link system. In FIG. 1, the figure in the parentheses below the "pixel" is the pixel value of that applicable pixel. This point is also the same for each of the following drawings.

FIG. 1 shows an example of (pulse) rising edges in the original image. As shown in FIG. 1, the pixels of the image (original image) that was sent are arrayed in the sequence of "pixel 1, pixel 2, pixel 3, pixel 4, pixel 5, pixel 6, pixel 7, pixel 8, . . . ." The pixel values from pixel 1 through pixel 3 are "100"; and the pixel values from pixel 4 to pixel 8 are "200."

Therefore when detecting horizontal edges (namely, the boundary where the pixel value changes) in this image, the edge detector detects a horizontal edge E0 between the pixel 3 and the pixel 4. This edge E0 is the rising edge. The horizontal edge is simply called the "edge" in the following description.

In order to transmit this image by the dual-link system, the transmission side subdivides this image into an odd image comprised from "pixel 1, pixel 3, pixel 5, pixel 7 . . . ", and an even image comprised of a "pixel 2, pixel 4, pixel 6, pixel 8, . . . ". The transmission side then sends these odd images and even images to the receiving side by way of the first link and the second link.

Here, the first link is contrived to transmit odd images, and the second link to transmit even images.

The combination image (first combination image) on the receiving side obtained by combining the first link image as the odd image, and the second link image as an even image in a process that is the same as on the transmission side, is identical to the original image. The pixels are arrayed in the sequence of "pixel 1, pixel 2, pixel 3, pixel 4, pixel 5, pixel 6, pixel 7, pixel 8, . . . . " Therefore, when the edge detector is detecting edges in the horizontal direction in the applicable first combination image, and no swaps (errors) have occurred among the links, the edge detector will then detect the edge E0 between the third pixel (pixel 3) and the fourth pixel (pixel 4) which is the same as in the original image.

However, if a swap has occurred between the links, then the receiving side will combine the first link image as an even image, and the second link image as an odd image so that the pixels of the combination image (second combination image) obtained in this way will be arrayed in the sequence of: "pixel 2, pixel 1, pixel 4, pixel 3, pixel 6, pixel 5, pixel 8, pixel 7, . . . " as shown at the bottom of FIG. 1.

The edge detector therefore detects a rising edge E1 between the second pixel (pixel 1) and the third pixel (pixel 4) of the second combination image; a falling edge E2 between the third pixel (pixel 4) and the fourth pixel (pixel 3); and a rising edge E3 between the fourth pixel (pixel 3) and the fifth pixel (pixel 6).

An example of a falling edge within the original image is described next while referring to FIG. 2.

Figure 2:
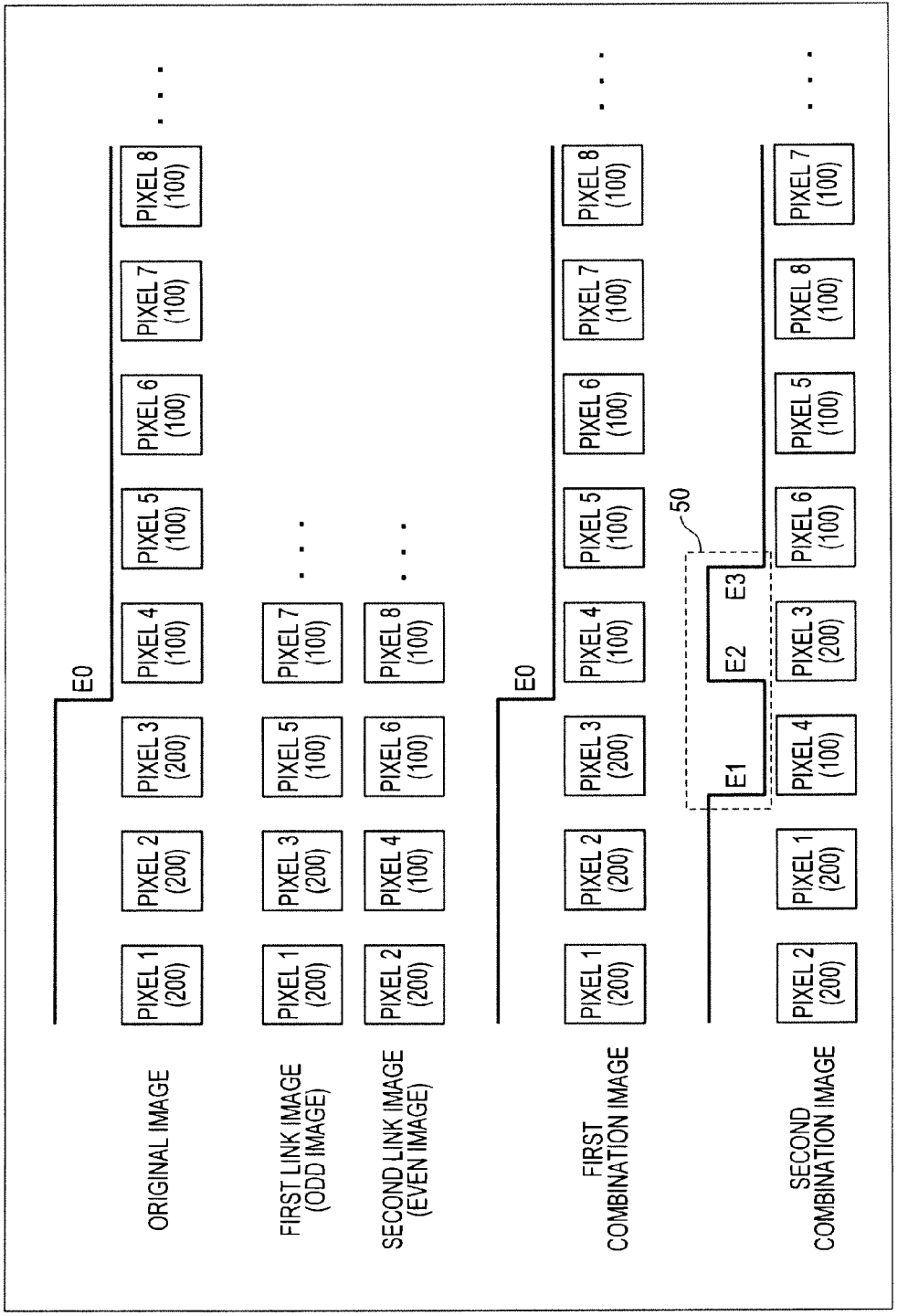
FIG. 2 is a drawing for describing the principle of the technology relating to the present invention (part 2)

Each pixel in the original image as shown in FIG. 2 is arrayed in the sequence of "pixel 1, pixel 2, pixel 3, pixel 4, pixel 5, pixel 6, pixel 7, pixel 8, . . . ". The pixel values of pixel 1 through pixel 3 are "200", and the pixel values of pixel 4 through pixel 8 are "100".

Therefore in this image, the edge detector detects a falling edge E0 between the pixel 3 and the pixel 4 when detecting horizontal edges.

In order to transmit this image by the dual-link system, the transmission side subdivides this image into an odd image comprised of "pixel 1, pixel 3, pixel 5, pixel 7, . . . ", and an even image comprised of "pixel 2, pixel 4, pixel 6, pixel 8, . . . ". The first link and the second link transmit the odd image and even image one after another to the receiving side.

In this processing also, the system exerts control on the transmission side so that the first link transmits odd images, and the second link transmits even images.

The receiving side combines the odd images of the first link image, with the even images of the second link images to obtain a combination image (first combination image) the same process as on the transmission side, that is identical to the original image. The pixels are arrayed in the sequence of "pixel 1, pixel 2, pixel 3, pixel 4, pixel 5, pixel 6, pixel 7, pixel 8, . . . ". Therefore, when the edge detector is detecting edges in the horizontal direction in the applicable first combination image, and no swaps (errors) have occurred among the links, then the edge detector will detect the falling edge E0 between the third pixel (pixel 3) and the fourth pixel (pixel 4) which is the same as in the original image.

However, if a swap has occurred between the links, then the receiving side will combine the first link image as an even image, and the second link image as an odd image so that the pixels of the second combination image obtained in this way will be arrayed in the sequence of: "pixel 2, pixel 1, pixel 4, pixel 3, pixel 6, pixel 5, pixel 8, pixel 7, . . . " as shown at the bottom of FIG. 2.

The edge detector therefore detects a falling edge E1 between the second pixel (pixel 1) and the third pixel (pixel 4) of the second combination image; a rising edge E2 between the third pixel (pixel 4) and the fourth pixel (pixel 3); and a falling edge E3 between the fourth pixel (pixel 3) and the fifth pixel (pixel 6).

This three edge cluster such as the edge E1, the edge E2, and the edge E3 in FIG. 1 and FIG. 2 is called a "triple edge". On this type of "triple edge" comprised of three consecutive horizontal edges with the rising edges and the falling edges arrayed alternately.

The three-weight edge includes two patterns. One is a pattern where two rising edges enclose one falling edge (the triple edge 50 in FIG. 1). The other is a pattern where two falling edges enclose one rising edge (triple edge 50 in FIG. 2).

Figure 3:
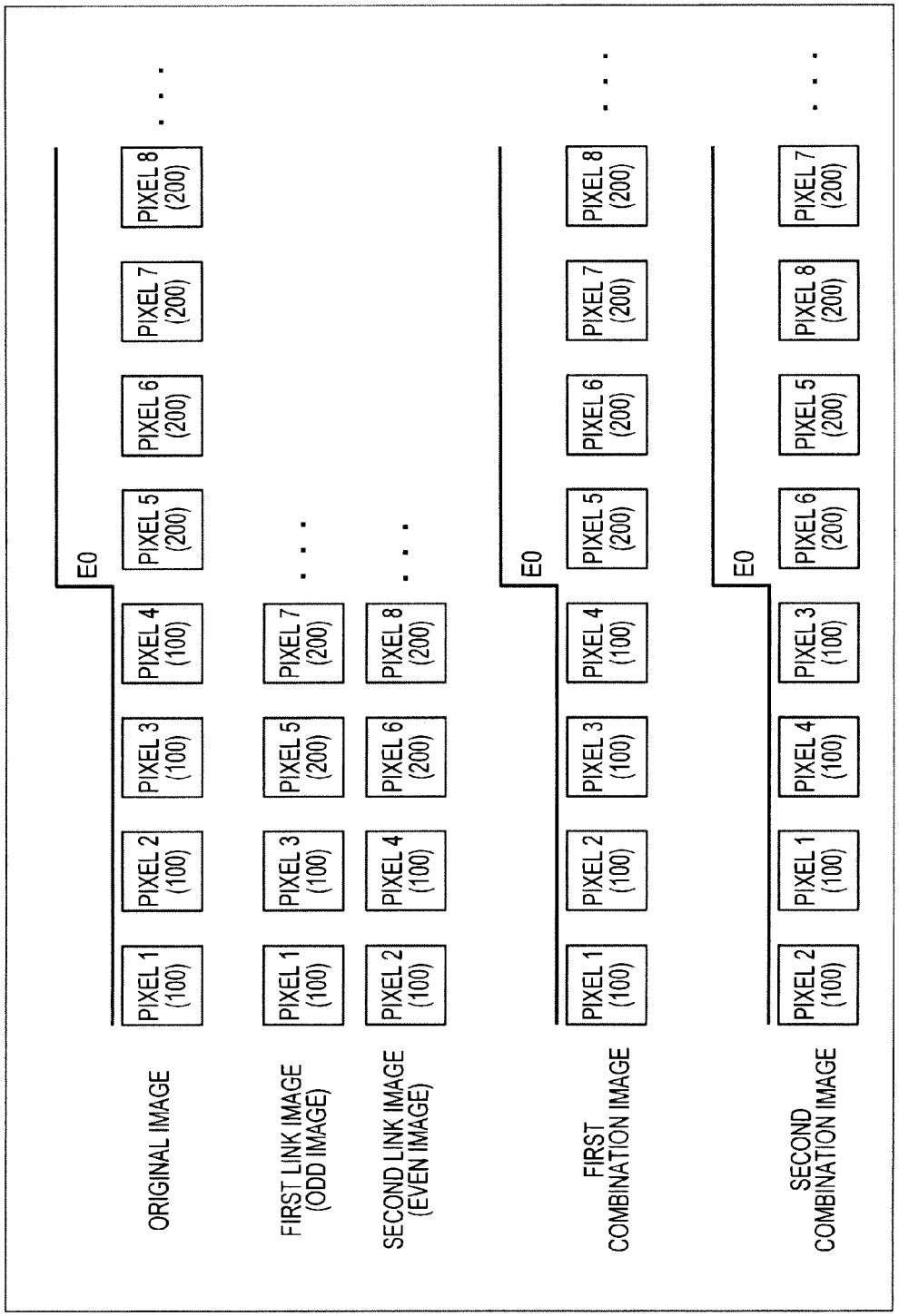
FIG. 3 is a drawing for describing the principle of the technology relating to the present invention (part 3)

Another example is utilized here to describe the case where a rising edge is present within the original image while referring to FIG. 3. In the original image in FIG. 1, the left-side pixel among the two pixels where the edge E0 was generated is an odd-numbered position pixel (pixel 3), and the right-side pixel is an even-numbered position pixel (pixel 4). In the original image in FIG. 3 on the other hand, the left-side pixel among the two pixels where the edge E0 was generated is an even-numbered position pixel (pixel 4), and the right-side pixel is an odd-numbered position pixel (pixel 5).

Each of the pixels in the original image as shown in FIG. 3 is arrayed in the sequence of "pixel 1, pixel 2, pixel 3, pixel 4, pixel 5, pixel 6, pixel 7, pixel 8, . . . ". The pixel values of pixel 1 through pixel 4 are "100", and the pixel values of pixel 5 through pixel 8 are "200".

Therefore, during edge detection in the horizontal direction, in this image the edge detector detects a rising edge E0 between the pixel 4 and the pixel 5.

In order to transmit this image by the dual-link system, the transmission side subdivides this image into an odd image comprised of "pixel 1, pixel 3, pixel 5, pixel 7, . . . ", and an even image comprised of "pixel 2, pixel 4, pixel 6, pixel 8, . . . ". The first link and the second link transmit the odd image and the even image one after another to the receiving side.

Here also, the system is contrived so that the first link transmits the odd images, and the second link transmits the even images.

If a swap has not occurred between the links, then the receiving side combines the odd image of the first link image, with the even image of the second link image to obtain a first combination image that is identical to the original image. The pixels are arrayed in the sequence of "pixel 1, pixel 2, pixel 3, pixel 4, pixel 5, pixel 6, pixel 7, pixel 8, . . . ". Therefore, when detecting edges in the horizontal direction in the applicable first combination image, the edge detector will detect the rising edge E0 between the fourth pixel (pixel 4) and the fifth pixel (pixel 5) which is the same as in the original image.

If a swap has occurred between the links, then the receiving side will combine the first link image with the second link image as the odd image, so that the combination image obtained in this way will have pixels arrayed in the sequence of: "pixel 2, pixel 1, pixel 4, pixel 3, pixel 6, pixel 5, pixel 8, pixel 7, . . . " as shown at the bottom of FIG. 3.

Therefore, during edge detection of the applicable second combination image in the horizontal direction, the edge detector detects a rising edge E0 between the fourth pixel (pixel 3) and the fifth pixel (pixel 6) the same as in the original image.

In other words, in the example shown in FIG. 3, in both the first combination image and the second combination image, the edge detector detects the same edge as in the original image, at the same section where it occurred in the original image.

Figure 4:
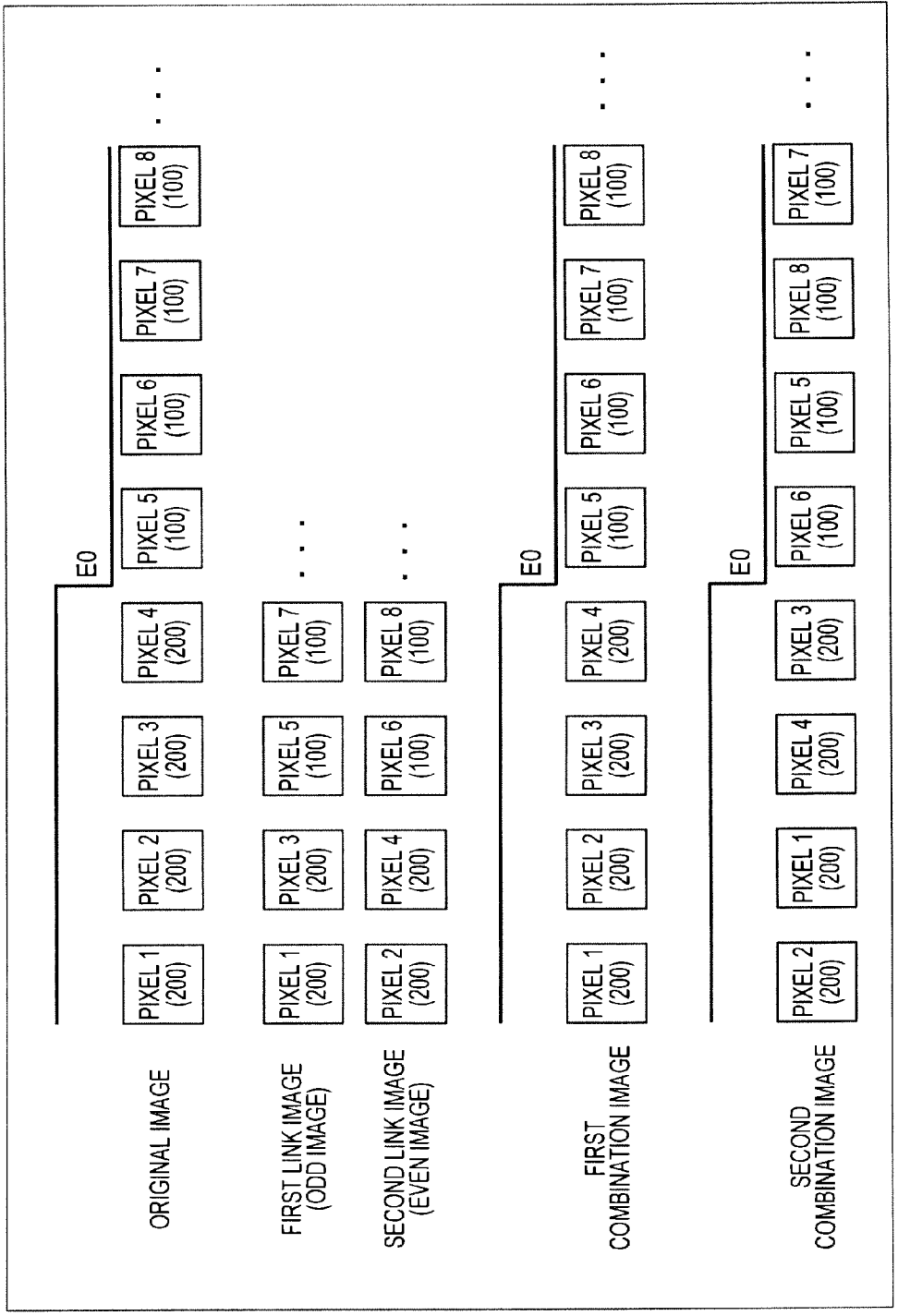
FIG. 4 is a drawing for describing the principle of the technology relating to the present invention (part 4)

FIG. 4 is a drawing for describing another example of a falling edge within the original image. In the original image in FIG. 2, the left-side pixel among the two pixels where the edge E0 was generated is the odd-numbered position pixel (pixel 3); and the right-side pixel is the even-numbered position (pixel 4). On the other hand, among the two pixels where the edge E0 was generated, the left-side pixel is the even-numbered position pixel (pixel 4); while the right-side pixel is the pixel in the odd-numbered position (pixel 5).

As shown in FIG. 4, each of the pixels in the original image is arrayed in the sequence of "pixel 1, pixel 2, pixel 3, pixel 4, pixel 5, pixel 6, pixel 7, pixel 8, . . . ". The pixel values of pixel 1 through pixel 4 are "200", and the pixel values of pixel 5 through pixel 8 are "100".

Therefore in this image, during edge detection in the horizontal direction, the edge detector detects a falling edge E0 between the pixel 4 and the pixel 5.

Therefore, in order to transmit this image by the dual-link system, the transmission side subdivides this image into an odd image comprised of "pixel 1, pixel 3, pixel 5, pixel 7, . . . " and an even image comprised of "pixel 2, pixel 4, pixel 6, pixel 8, . . . ". The first link and the second link transmit the odd image and the even image one after another to the receiving side.

Here also, the system is contrived so that the first link transmits the odd images, and the second link transmits the even images.

If a swap has not occurred between the links, on the receiving side, the first combination image obtained by combining the first link image as the odd image with the second link image, is identical to the original image. The pixels are arrayed in the sequence of "pixel 1, pixel 2, pixel 3, pixel 4, pixel 5, pixel 6, pixel 7, pixel 8, . . . ". Therefore, when detecting edges in the applicable first combination image in the horizontal direction, the edge detector will detect the falling edge E0 between the fourth pixel (pixel 4) and the fifth pixel (pixel 5) which is the same as in the original image.

Moreover, when a swap has occurred between the links, the second combination image obtained on the receiving side by combining the first link image with the second link image as the odd image, is an image with pixels arrayed in the sequence of "pixel 2, pixel 1, pixel 4, pixel 3, pixel 6, pixel 5, pixel 8, pixel 7, . . . " as shown at the bottom of FIG. 4.

Therefore, during edge detection of the applicable second combination image in the horizontal direction, the edge detector detects a falling edge E0 between the fourth pixel (pixel 3) and the fifth pixel (pixel 6) the same as in the original image.

In other words, in the example shown in FIG. 4, in both the first combination image and the second combination image, the edge detector detects the same edge as in the original image, at the same section where it occurred in the original image.

As can be understood from the above description, when a swap occurs between links during transmission on the dual-link system of an original image subdivided into an odd image and an even image, and the edges in the original image are between the pixel in the odd-numbered position, and a pixel (pixel in even-numbered position) on the right side of the applicable pixel, a triple-edge 50 then appears in the combination image (second combination image in FIG. 1 and FIG. 2) in the section corresponding to that edge and within a range in proximity to that section. On the other hand, when the edge in the original image is between a pixel in an even-numbered position, and a pixel (pixel in an odd-numbered position) to the right side of the applicable pixel, then the same edge is detected at the section corresponding to the above edge in the combination image (second combination image in FIG. 3 and FIG. 4), and the triple-edge 50 is not detected.

The present invention of these specifications based on the above described knowledge, implements two techniques for speedily detecting swaps between links.

A first technique utilizing the first link image transmitted by the dual-link system as an odd image, combines the first link image with a second link image to generate a first combination image; and utilizing a second link image as an odd image, combines the first link image with the second link image to generate a second combination image. The edge detector then detects horizontal edges in the first combination image and the second combination image.

In either of the first combination image or the second combination image, one edge is then selected for example in the first combination image among edges that occurred between the pixel in the odd-numbered position and, the pixel (pixel in even-numbered position) on the right adjacent side of the applicable pixel. This edge is hereafter called the "reference edge" for purposes of convenience.

If the reference edge is a rising edge, then a check is made on whether a first pattern triple edge 50 shown in FIG. 1 was detected centering on a position at the other combination image (here, the second combination image) corresponding to the reference edge position in one of the combination images (here, the first combination image). If the reference edge is a falling edge, then a check is made on whether a second pattern triple edge 50 shown in FIG. 2 was detected centering on the applicable position in the second combination image.

If these check results shows "Detected", then a swap is judged to have occurred in the second combination image and is an "error" image. In this case, the first link image is the odd image, and the second link image is the even image.

If the check results on the other hand show "Not-Detected", then the edge that occurred in the second combination image between a pixel in the odd-numbered position and the pixel (pixel in even-numbered position) on the right adjacent side of the applicable pixel is selected as the reference edge. The check made on the second composite image is then performed on the first combination image.

If the check results show "Detected", then the system judges a swap has occurred in the first combination image and is an (error) combination image. In this case, the first link image is an even image; and the second link image is an odd image.

If the check results show "Not-Detected" then another reference edge different from the previous selected reference edge is selected from the first combination image, and checked against the second combination image.

The switching of the combination image where the reference edge was selected; the reselection of the reference edge, and making a check for a triple edge are performed repeatedly in this way until a "Detected" check result is obtained and judged an error.

This technique is capable of detecting a swap before the combination image is displayed, and so a swap can be speedily detected between links faster than when using prior techniques of the related art.

Moreover if using the technique of the related art that displays combination images then judging whether or not an abnormality that occurred is due to a swap or is due to an object in the original image is difficult so the method of the related art does not provide high accuracy when detecting swaps. The technology of this invention however makes a swap judgment based on characteristic features of the edge in the combination image when a swap has occurred and so raises the swap detection accuracy.

The technique of the present invention moreover can swiftly detect swaps just by adding a circuit to the receiving side and moreover does not require making any type of changes or modifications to the transmission circuit already in use or expanding the currently utilized standards.

Different types of measures may be added to boost the swap judgment accuracy. When selecting the reference edge for example, an edge can be selected that has strength greater than the specified threshold. A stronger edge may also be selected in advance.

Moreover instead of selecting one reference edge at one time, a plurality of reference edges may be selected at one time, and the applicable plural reference edges may be utilized to check the other combination image. To speed up the swap judgment, if the check result is "Detected" at this time for any or any one of these multiple reference edges, then the other combination image may be judged as an "Error". To boost swap judgment accuracy even further, the other applicable combination image may be judged as "Error" when check results for all of the multiple reference edges are "Detected". Dispersing the position and the strength setting when selecting multiple reference edges will help boost judgment accuracy in such cases. Other methods may also be utilizing including methods for judging an error in the other applicable combination image when the check results for a specified number of reference edges among multiple reference edges are "Detected" or judging an "Error" in the other applicable combination image when there are more "Detected" than "Not-Detected" results among the judgment results for the multiple reference edges.

A second technique utilizing a first link image transmitted by the dual-link system as an odd image the same as in the first technique, combines the first link image with a second link image to generate a first combination image; and utilizing the second link image as an odd image, combines a first link image and a second link image to generate a second combination image. The edge detector then detects horizontal edges in the first combination image and the second combination image.

The above described triple edges are then detected in each first combination image and second combination image and their total number is counted. The triple-edge patterns are not identified here.

Normally there are always many multiple edges within one image. Many of these edges are also located between the pixel in the odd-numbered position, and the pixel (pixel in even-numbered position) on the right adjacent side of the applicable pixel.

The number of triple edges in a combination image where a swap has occurred is therefore larger than the number of triple edges in a combination image where no swaps have occurred.

A combined image found to contain a larger number of triple edges after comparing the number of triple edges in the first combination image and the second combination image can therefore be judged as the error image. More specifically, if the number of triple edges is larger in the first combination image, then the first combination image is an (error) combination image where a swap has occurred. The first link image in this case is an even image, and the second link image is an odd image.

Conversely, if the number of triple edges is larger in the second combination image, then the second combination image is an (error) combination image where a swap has occurred. In this case, the first link image is an odd image, and the second link image is an even image.

This second technique is also capable of rendering the same results as the first technique. Different types of measures can also be contrived to enhance the judgment accuracy.

For example, rather than utilizing only one pair of combination images (first combination image and the corresponding second combination image) triple edges for example can be detected in multiple first link combination images, and the multiple second link images corresponding to each of the applicable first link images. The sum total of triple edges in the multiple first combination images is then compared with the sum total of triple edges in the multiple second combination images, and the combination containing the larger sum total is judged as having the error. In other words, when the sum total of triple edges is larger in the multiple first combination images, then the first link images are judged as even images, and the second link images are judged as odd images. However when the sum total of triple edges is larger in the multiple second combination images, then the first link images are judged as odd images, and the second link images are judged as even images.

Moreover, along with making judgments only by detecting triple edges where the strength of the three edges all exceed a specified threshold; the threshold (value) can be changed and a threshold confirmed when the same judgment results occurs for any of multiple different thresholds.

The principle of the present invention is described next utilizing a device as a specific example and by referring to the drawings. In order to simplify the description, the following text and drawings are simplified and abbreviated as convenient. Moreover, the hardware for each of the required components in the drawings and the function blocks for performing the various processing can be comprised from a CPU, memory, and other circuits; and the software can be implemented by a program loaded into the memory, etc. Therefore, as is readily apparent to one skilled in the art, these function blocks can be implemented by hardware alone, by software alone, or by a combination of hardware and software and so do not limit or restrict the invention. In each of the drawings, the same reference numerals are assigned to the same elements, and redundant descriptions are omitted where required.

The above described program is storable using a non-transitory computer readable medium, and may be supplied to a computer. Non-transitory computer readable mediums may include tangible storage medium in a variety of forms. Examples of non-transitory computer readable media may include magnetic recording media, (such as flexible disks, magnetic tape, and hard disk drives), magneto-optic recording media (such as magneto-optic disks), CD-ROM (Read Only Memory) CD-R, CD-R/W, semiconductor memories (such as mask ROM, PROM (Programmable ROM), EPROM (Erasable PROM), flash ROM, and RAM (Random Access Memory)). Programs may include transitory computer readable medium of various types that can be supplied to computers. These transitory computer readable medium may include electrical signals, optical signals, and electromagnetic waves. These transitory computer readable mediums can be supplied as programs to the computer by way of cable communication paths or radio (wireless) channel communication paths.

First Embodiment

Figure 5:
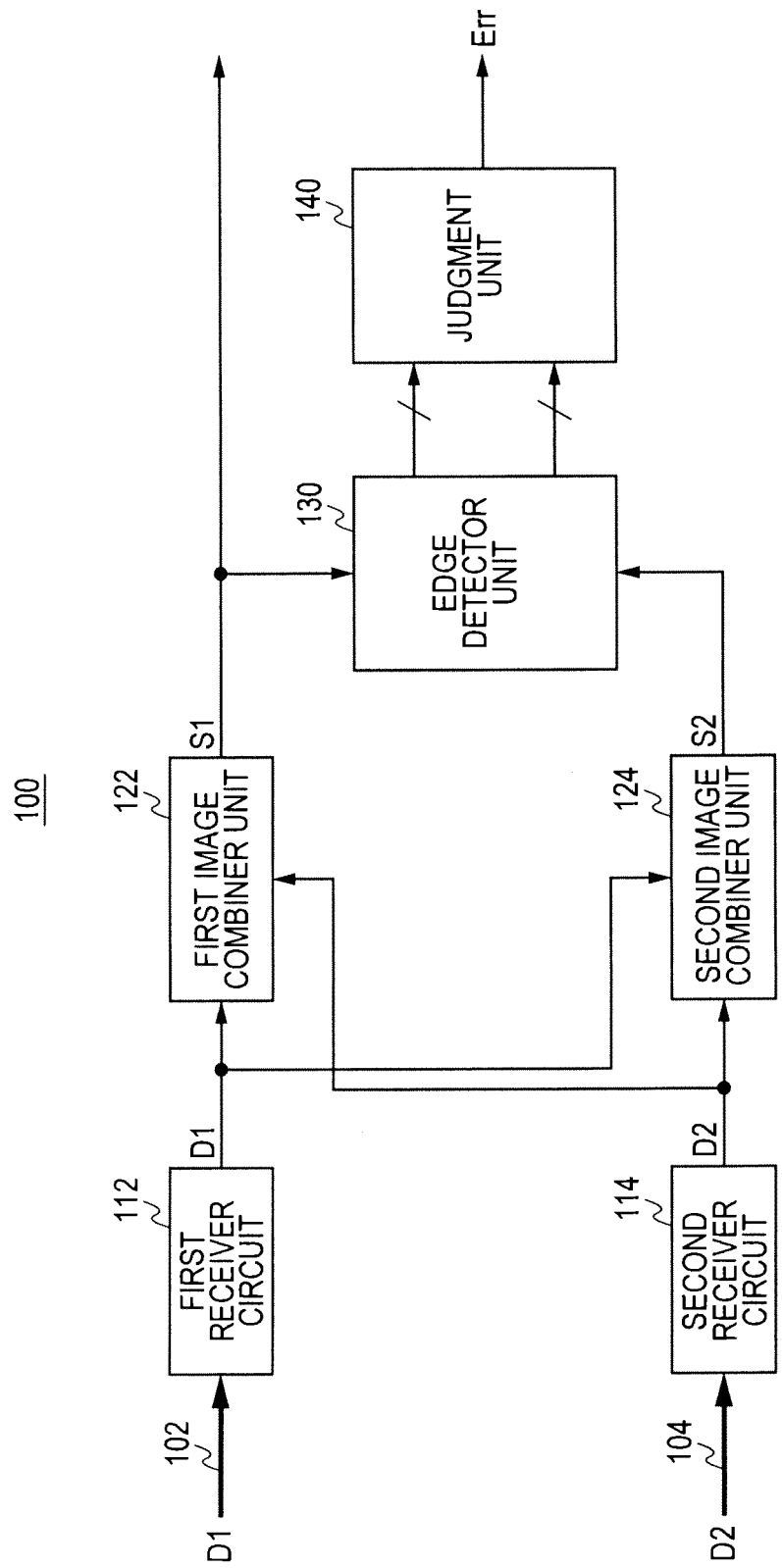
FIG. 5 is a drawing for showing the video processor device relating to the first embodiment of the present invention.

FIG. 5 shows the video processor device 100 of the first embodiment of the present invention. The video processor device 100 combines the odd images and the even images respectively transmitted by the first link 102 and the second link 104 to generate and output combination images. The video processor device 100 is comprised of a first receiver circuit 112, a second receiver circuit 114, a first image combiner unit 122, a second image combiner unit 124, an edge detector unit 130, and a judgment unit 140.

The first receiver unit 112 is coupled to the first link 102, and outputs the first link image sent by the first link 102 to the first image combiner unit 122 and the second image combiner unit 124.

The second receiver unit 114 is coupled to the second link 104, and outputs the second link image D2 transmitted by the second link 104 to the first image combiner unit 122 and the second image combiner unit 124.

The first image combiner unit 122 utilizing the first link image D1 as the odd image, combines the second link image D2 with the first link image D1 to generate the first combination image S1, and along with outputting image S1 to an external section that may for example be a display device such as a liquid crystal panel, also outputs it to the edge detector unit 130.

The second image combiner unit 124, utilizing the second link image D2 as the odd image, combines the second link image D2 to the first link image D1 to generate the combination image S2. The second image combiner unit 124 outputs the second combination image S2 to the edge detector unit 130.

If there is no swap between the links, the video processor device 100 is designed so that the first link 102 transmits an odd image; the first receiver unit 112 outputs the odd image, the second link 104 transmits the even image, and the second image combiner unit 124 outputs the even image. In other words if there is no swap between links then the first image combiner unit 122 transmits the correct image to an external section.

However, when the transmit device must output an odd image to the first link 102, and an even image to the second link 104, the problem occurs that an even image is output to the first link 102, and an odd image is output to the second link 104 due to a conflict in specifications between the transmit device that sends images to the video processor device 100 and the image processor device 100 itself. In this case, a swap has occurred between the links.

Moreover, even if the specifications between the transmit device and the video processor device 100 are made compatible, instead of inputting the first link 102 image to the first receiver circuit 112, and the second link 104 image to the second receiver circuit 114; the problem sometimes occurs that the first link 102 image is inputted to the second receiver circuit 114, and the second link 104 image is inputted to the first receiver circuit 112 due to causes such as wiring errors in the connector (not shown in drawing) that couples the first link 102 and the second link 104 in the video processor device 100. In this case also, a swap has occurred between the links.

When a swap occurs between the links, the image output from the first receiver circuit 112 becomes an even image, and the image output by the second receiver circuit 114 becomes an odd image. The first image combiner unit 122 combines the image from the receiver circuit 112 as an odd image so that the first combination image S1 generated and output from the first image combiner circuit 122 is the wrong (incorrect) combination image.

The edge detector 130 and the judgment unit 140 detect if there is a swap between links, or in other words detect whether or not the first combination image S1 is correct or not.

First of all, the edge detector 130 detects horizontal edges in the first combination image S1 and the second combination image S2. The edge detector 130 further detects triple edges from each of the detected horizontal edges and outputs the detected results to the judgment unit 140. These detected results are for example the positions of each of the triple edges in each first combination image S1 and each second combination image S2. This edge detector unit 130 does not distinguish between first pattern triple edges and second pattern triple edges.

The judgment unit 140 counts the number of triple edges in the first combination image S1 and the number of triple edges in the second combination image S2 in the detected results from the edge detector 130 and compares the two quantities. The judgment unit 140 then decides based on these results whether the first combination image S1 is the correct combination image or not. The video processor device 100 of the first embodiment in other words utilizes the second technique as described in the principles of the present invention.

More specifically, when there are a greater number of triple edges in the first combination image S1, the judgment unit 140 then judges that a swap has occurred between links, and that the first combination image S1 is not correct, and outputs an error signal Err.

In this case, the swap between links has in fact caused the first link image D1 to become an even image, and the second link image D2 to become an odd image.

On the other hand, when there are a greater number of triple edges in the second combination image S2, then the judgment unit 140 judges that no swap has occurred between the links, and that the first combination image S1 is the correct combination image. In this case, the judgment unit 140 does not output an error signal Err.

Since no swap has occurred in this case, the first link image D1 is an odd image, and the second link image D2 is an even image just as intended in the system design.

The video processor device 100 of the present embodiment can therefore in this way detect in real-time a swap between links, and whether or not an abnormality occurred in the combination image caused by a swap during the combining and outputting of the odd image and even image transmitted by the dual-link system.

Second Embodiment

Figure 6:
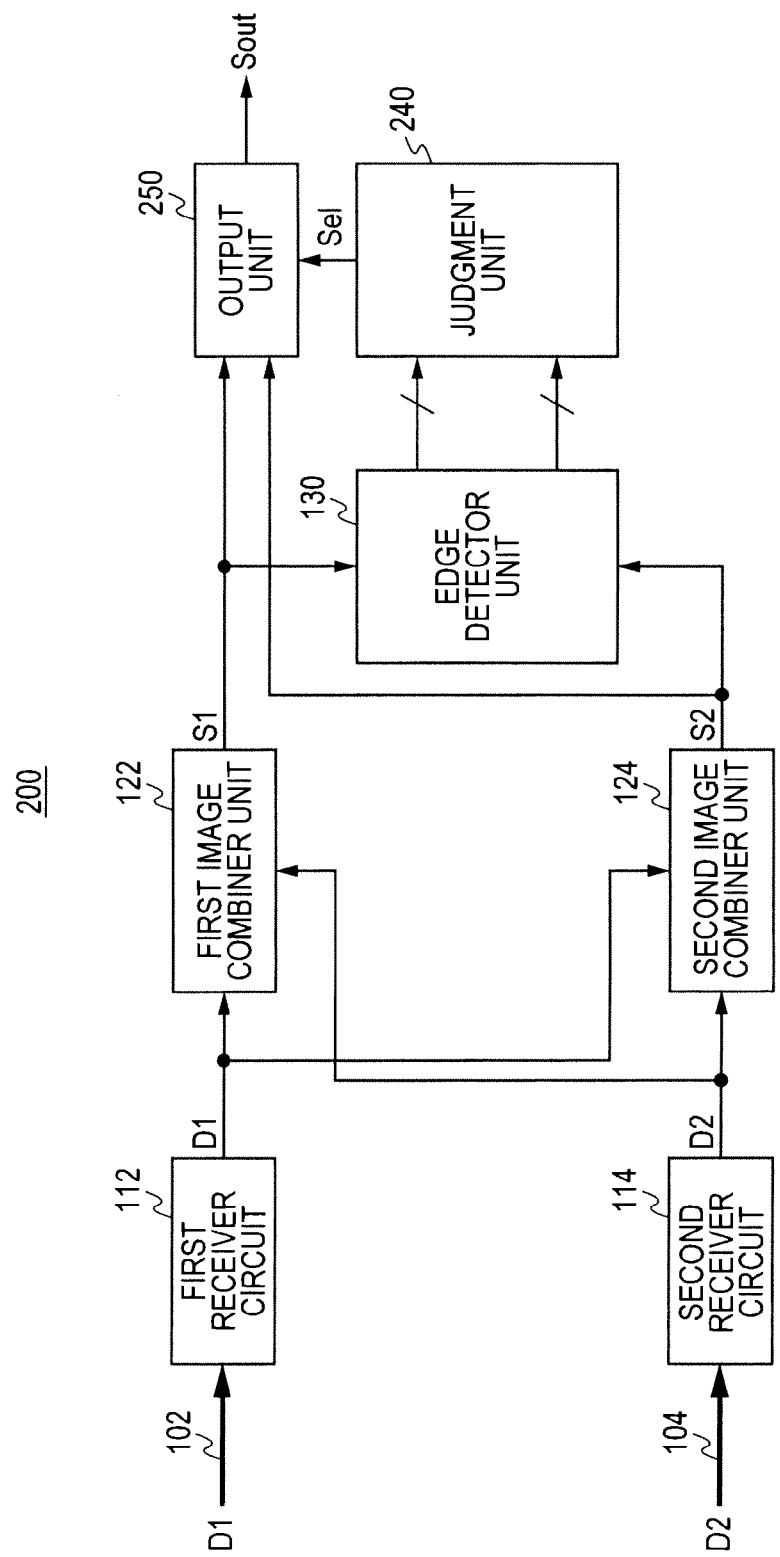
FIG. 6 is a drawing for showing the video processor device relating to the second embodiment of the present invention.

FIG. 6 is a block diagram of the video processor device 200 relating to the second embodiment of the present invention. The video processor device 100 shown in FIG. 1, utilizing the first link image D1 as the odd image, combines the first link image D1 and the second link image D2 to obtain and output the first combination image S1. The video processor device 100 also outputs an error signal when the applicable first combination image S1 is not the correct combination image. The video processor device 200 on the other hand always outputs a correct combination image Sout regardless of whether a swap has occurred or not occurred between links.

The video processor device 200 is identical to the video processor device 100 except for the point that an output unit 250 has been added, a second combination image S2 is also output to this output unit 250, and the judgment unit 240 outputs a selection signal Sel to the output unit 250. The description of the video processor device 200 only covers the output unit 250 and the judgment unit 240.

The output unit 250 is coupled to the first image combiner unit 122 and the second image combiner unit 124. The first image combiner unit 122 generates a first combination image S1 and the second image combiner unit 124 generates a combination image S2 and the units input these S1 and S2 images to the output unit 250. The output unit 250 then selects either the first combination image S1 or the second combination image S2 as the output image Sout according to the selection signal Sel from the judgment unit 240 and outputs the output image Sout to an external unit.

The judgment unit 240 functioning the same as the judgment unit 140 in the video processor device 100, judges whether the first combination image S1 or the second combination unit S2 is the correct combination image by comparing the number of triple edges. Based on the judgment results, the judgment unit 240 then outputs a select signal Sel showing the correct combination image to the output unit 250.

In other words, the video processor unit 200 of this embodiment constantly outputs the correct combination image regardless of whether or not a swap has occurred between links.

Third Embodiment

Figure 7:
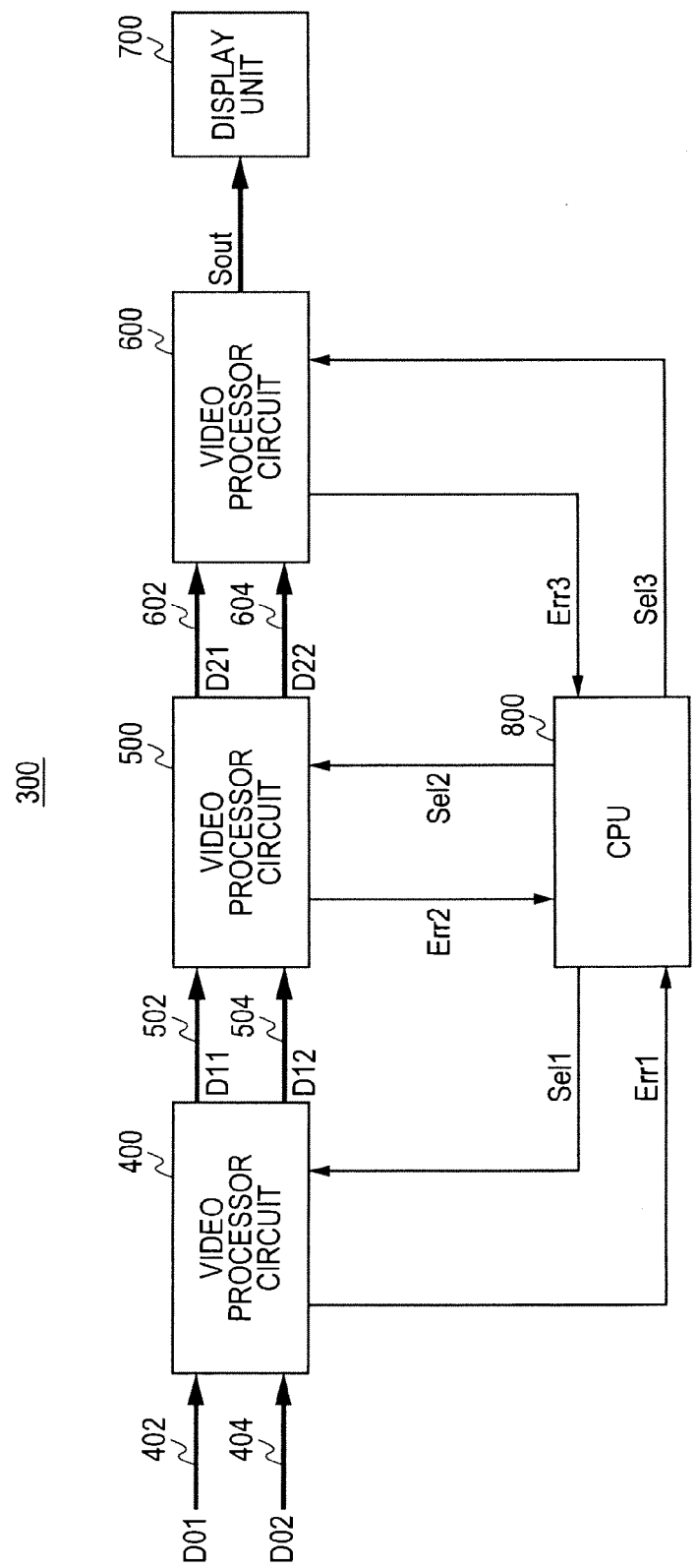
FIG. 7 is a drawing showing the video processor system relating to the third embodiment of the present invention.

FIG. 7 is a block diagram showing the video processor system 300 relating to the third embodiment of the present invention. The video processor system 300 includes a video processor circuit 400, a video processor circuit 500, a video processor circuit 600, a display unit 700, and a CPU (Central Processing Unit) 800.

The video processor system 300 performs various video processing on the first link image D01 and the second link image D02 transmitted by way of the first link 402 and the second link 404 from an image transmission device not shown in the drawing. The video processor system 300 then shows the obtained output image Sout on the display unit 700. The display unit 700 is for example a digital display unit, etc.

The video processor circuit 400 is coupled to an image transmission device not shown in the drawing that inputs a first link image D01 and a second link image D02 from a first link 402 and a second link 404. The video processor unit 400 is also coupled to a video processor circuit 500 by the first link 502 and a second link 504, and outputs a first link image D11 and a second link image D12 described later on to the video processor circuit 500.

The video processor circuit 500 is coupled to the video processor circuit 400 by the first link 502 and the second link 504 that input a first link image D11 and a second link image to the video processor circuit 500. This video processor circuit 500 is also coupled to the video processor circuit 600 from a first link 602 and a second link 604 that output a first link image D21 and a second link image D22 described later on to the video processor circuit 600.

The video processor circuit 600 is coupled to the video processor circuit 500 by the first link 602 and the second link 604, that input a first link image D21 and a second link image D22 to the video processor circuit 600. The video processor circuit 600 is coupled to the display unit 700, and outputs an output image Sout to the display unit 700 in order to display that output image Sout.

The CPU 800 receives each of the error signals (error signal Err1, error signal Err2, and error signal Err3) from the video processor circuit 400, video processor circuit 500, and video processor circuit 600, and outputs each of the selection signals (selection signal Sel1, selection signal Sel 2, selection signal Sel 3) to the video processor circuit 400, video processor circuit 500, and video processor circuit 600. These error signals and selection signals are described in detail later on.

Figure 8:
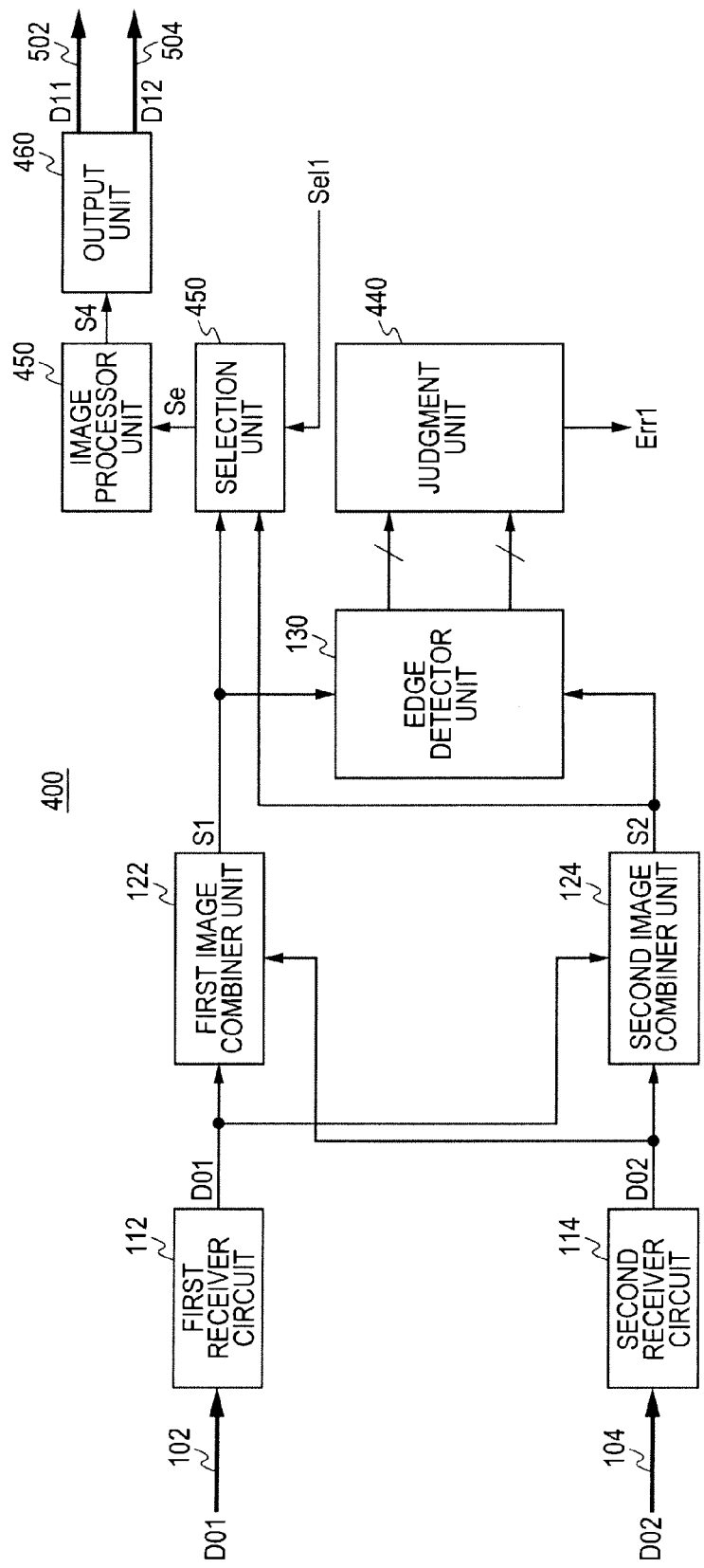
FIG. 8 is a drawing showing the first video processor circuit of the video processor system shown in FIG. 7.

FIG. 8 is a block diagram showing the video processor circuit 400. The first receiver circuit 112, second receiver circuit 114, first image combiner circuit 122, second image combiner circuit 124 and edge detector unit 130 in the video processor circuit 400, contain functions equivalent to the function blocks corresponding to those in the video processor device 100 and the video processor device 200, and a description is omitted here.

The judgment unit 440 decides whether or not a swap has occurred between the links, and outputs an error signal Err1 to the CPU 800 if a swap has occurred. The technique for detecting whether or not a swap has occurred is identical to the technique utilized in the judgment unit 140 in the video processor device 100 shown in FIG. 1. The "whether or not a swap has occurred between the links" signifies the same meaning as "whether or not the image D01 of the first link is an odd image or not", or "whether the first combination image S1 is the correct combination image or not".

If an error signal Err1 showing that a "swap has occurred" is not received, then the CPU 800 outputs a select signal Sel1 that selects the first combination image S1 to the image processor unit 450. On the other hand, when an error signal Err1 is received, the CPU 800 outputs a select signal Sel1 to the image processor unit 450 to select the second combination image S2.

The image processor unit 450 selects either the first combination image S1 or the second combination image S2 according to the select signal Sel1 from the CPU 800, and outputs that selected combination image to the image processor unit 450.

The image processor unit 450 performs the specified image processing on the combination image Se (correct combination image among the first combination image S1 and second combination image S2) and after processing is complete sends a combination image S4 to the output unit 460.

The image processing implemented by the image processor unit 450 is for example processing such as image sharpening or noise cancelling for improving the image quality, and needless to say the processing is not limited to these processing types.

The output unit 460 divides the now processed composite image S4 from the image processor unit 450, into an odd image and an even image, and outputs the odd image as the first link image D11 to the first link 502, and outputs the even image as the second link image D12 to the second link 504.

Namely, when a swap has occurred on an image input to it, the video processor circuit 400 is capable of notifying the CPU 800 of the swap, and can also constantly acquire the correct image and perform image processing regardless of whether a swap has occurred between the links.

Except for the point that the type of image processing performed is different from the image processing performed by the image processor unit 450 in the video processor circuit 400, the video processor circuit 500 is identical to the video processor circuit 400 and so a detailed description is omitted here. This video processor circuit 500 is also capable of notifying the CPU 800 if a swap has occurred, and capable of constantly obtaining a correct image and performing image processing regardless of whether a swap has occurred between the links.

Figure 9:
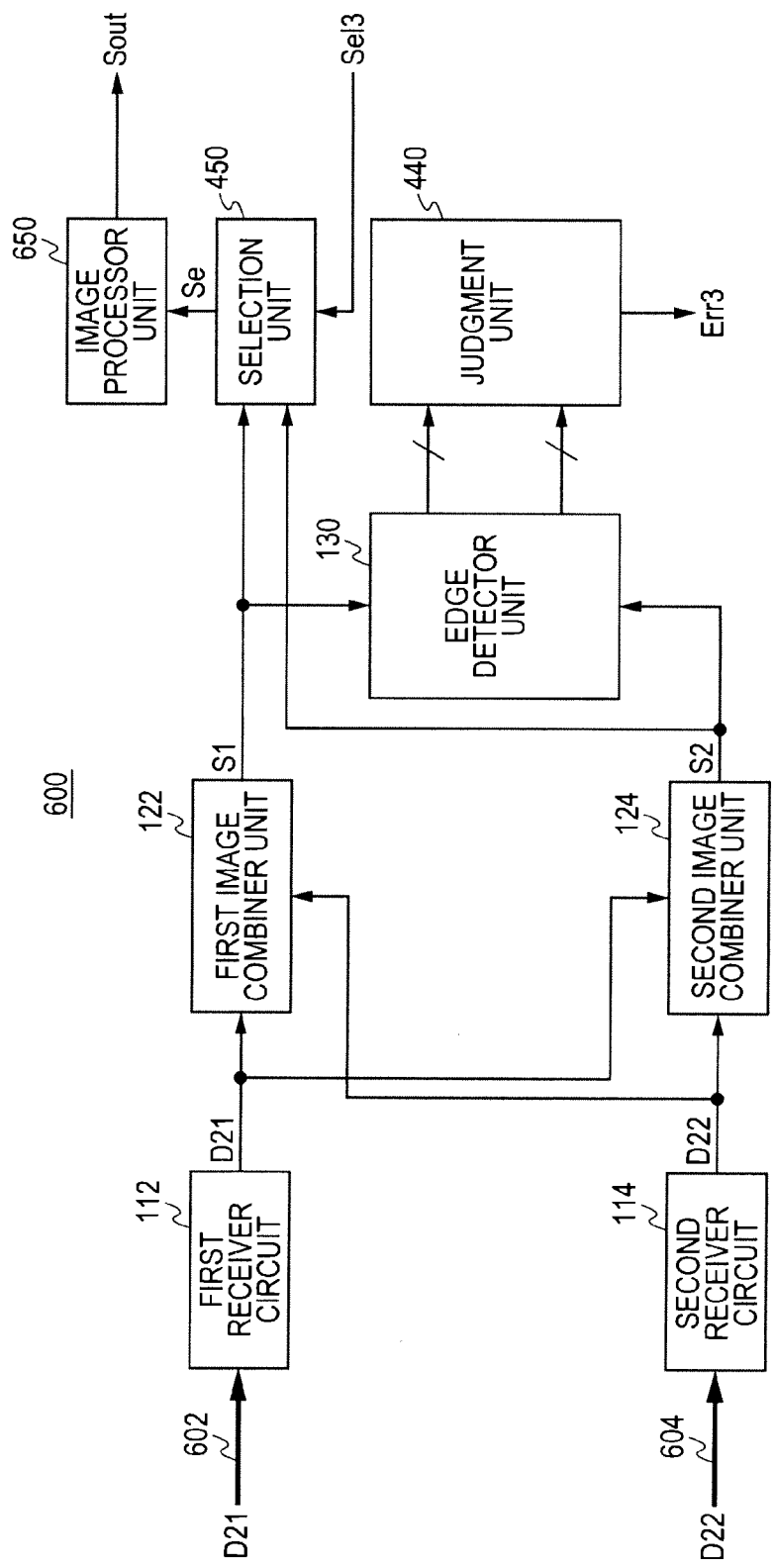
FIG. 9 is a drawing showing the last video processor circuit of the video processor system shown in FIG. 7.
Figure 10:
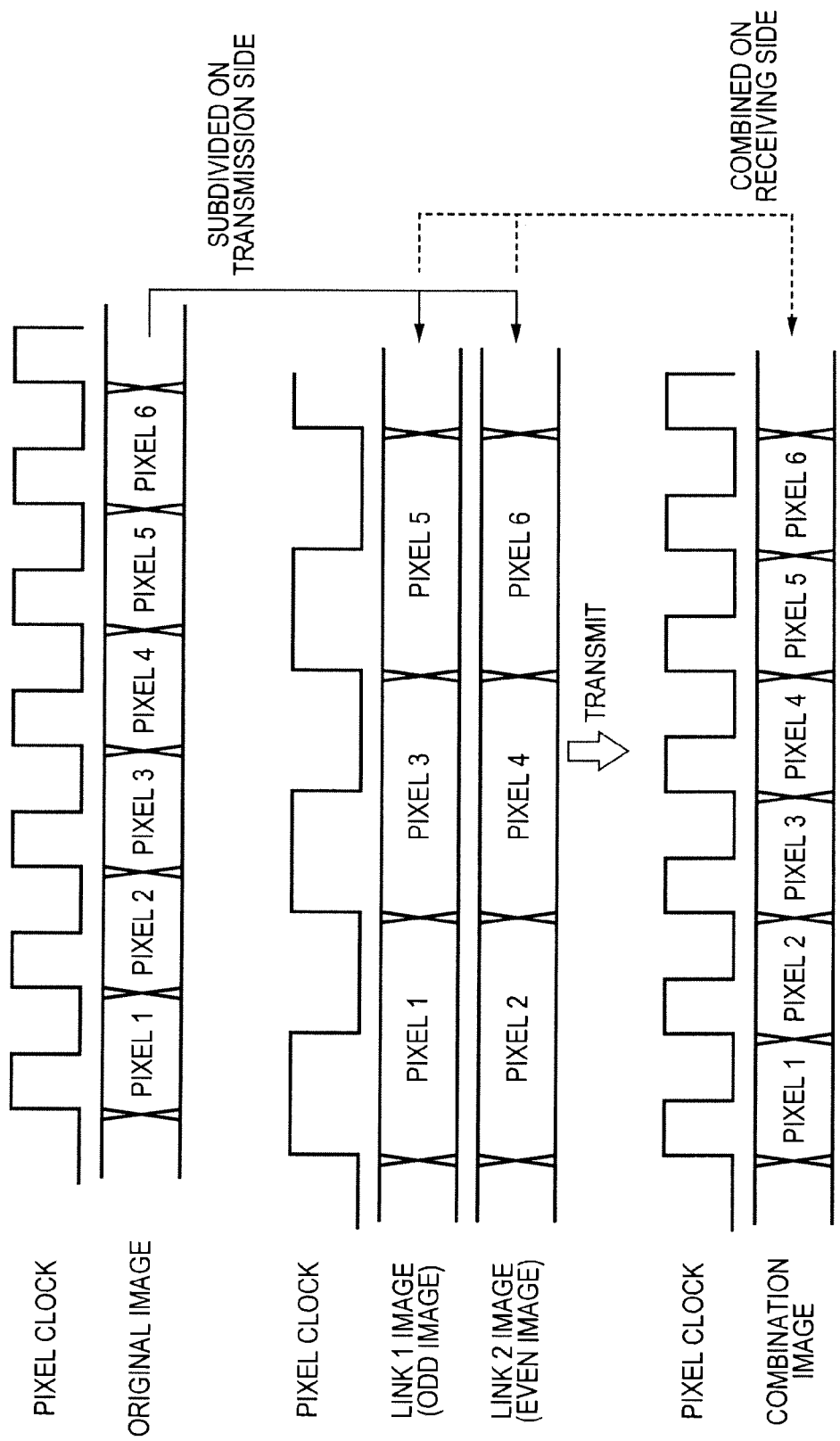
FIG. 10 is a drawing for describing the concept of image transmission by the dual-link system.
Figure 11:
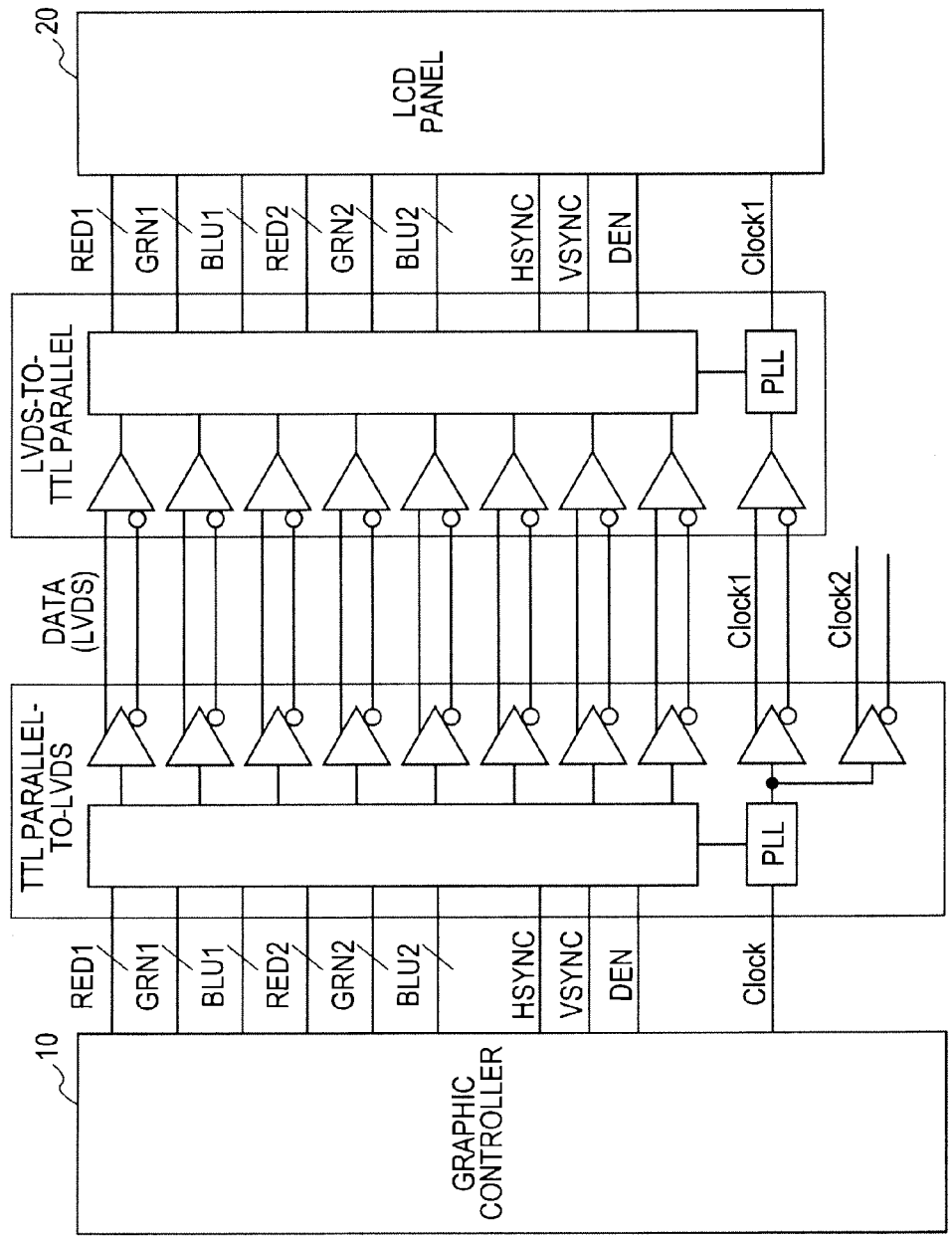
FIG. 11 is the FIG. 7.1 of JEIDA-59-1999 Digital Monitor Interface Standards Version 1.0.

FIG. 9 shows the video processor circuit 600. The video processor circuit 600 is identical to the video processor circuit 400 except for the point that the image processing is a different type than the image processing implemented by the video processor circuit 400 and the video processor circuit 500, and that after the processing the combination image is output unchanged without subdividing the combination image. Here, only the image processor unit 650 within the video processor circuit 600 is described.

The image processor unit 650 performs the specified image processing on the combination image Se (correct image among the first combination image S1, and the second combination image S2) that the selector unit 450 selected and output according to the selection signal Sel 3 from the CPU 800, and after the processing, outputs the combination image Sout to the display unit 700.

When a swap has occurred within an image that was inputted to the image processor unit 650 itself, the image processor unit 650 notifies the CPU 800 of the swap by outputting an error signal Err3 to the CPU 800.

As described above, based on whether or not there is an error signal from any of the video processor circuits, the CPU 800 outputs a selection signal to the applicable video processor circuit for selecting the correct combination image. The CPU 800 may also notify the administrator with information showing the video processor circuit for that error signal for example by writing the information on a recording device, outputting the information to a printer, or displaying the information on a monitor, etc.

In systems that transmit image data multiple times by a dual-link system utilizing a plurality of function blocks, and that example check for swaps between links by verifying the last displayed combination image, finding out on what function block level the swap occurred is difficult even if a swap was confirmed to have occurred. The greater the number of locations for transmitting image data by the dual-link system, the more difficult identifying the swap detection location becomes.

However in the video processor system 300 of the present embodiment, each video processor circuit can select the correct combination image and then output it in the latter stage after performing the image processing. Moreover, each video processor circuit can output an error signal to the CPU 800 if a swap occurred between the links in the image inputted to that video processor circuit itself, so that whether a swap occurred can be easily confirmed at any stage in the video processor circuit.

The embodiments of the present invention were described above. However, the above embodiments are examples, and all manner of modifications, or reductions or increases not departing from the scope and spirit of the present invention may be made to the embodiments. As is readily understandable to one skilled in the art, the adaptations achieved through making modifications, reductions or increases are within the scope of the present invention.

In each of the above described embodiments for example, the technique used for judging whether the first combination image or the second combination image is the correct combination image, is the second technique as described in the principle of the present invention. However, the first technique may also be applied to these embodiments.

The respective variations and contrivances related in the description of the principle of the present invention may also be added to the judgment process.

What is claimed is:

1. A video processor device comprising:
a first image combiner unit to combine images configuring a video sub-divided into odd images having pixels in horizontal odd-numbered positions, and even images having pixels in horizontal even-numbered positions and each transmitted by the dual-link system over a first link and a second link, as a first link image of odd images and a second link image of even images to generate and output a first combination image;
a second image combiner unit to combine the first link image of even images, and the second link image of odd images to generate and output a second combination image;
an edge detector to detect, the number of triple edges including three consecutive edges along a horizontal direction and alternately arrayed as rising edges and falling edges respectively in the first combination image and the second combination image; and
a judgment unit to compare the number of triple edges in the first combination image and the second combination image, and to judge the second link images as odd images when the number of triple edges is larger in the first combination image, and judge the first link images as the odd images when the number of triple edges is larger in the second combination image.

2. A video processing method comprising the steps of:
generating and outputting a first combination image by combining images configuring a video sub-divided into odd images having pixels in horizontal odd-numbered positions and even images having pixels in horizontal even-numbered positions and each transmitted by the dual-link system over a first link and a second link, as a first link image of odd images and a second link image of even images;
generating and outputting a second combination image by combining the first link image of even images and the second link image of odd images;
detecting the number of triple edges including three consecutive edges along a horizontal direction and alternately arrayed as rising edges and falling edges, respectively in the first combination image and the second combination image; and
judging the second link image as an odd image when the number of triple edges is larger in the first combination image, and judging the first link image as an odd image when the number of triple edges is larger in the second combination image.

3. A video processor device comprising:
a first image combiner unit to combine images configuring a video sub-divided into odd images having pixels in horizontal odd-numbered positions, and even images having pixels in horizontal even-numbered positions and each transmitted by the dual-link system over a first link and a second link as a first link image of odd images and a second link image of even images to generate and output a first combination image;
a second image combiner unit to combine the first link image of even images, and the second link image of odd images to generate and output a second combination image;
an edge detector to detect horizontal edges in the first combination image and the second combination image; and
a judgment unit to decide a combination image of one of either the first combination image or the second combination image is an error image when: the triple edge of a first pattern was detected in a section centering on a position in the other combination image corresponding to the position where a rising edge was detected between a pixel in an odd-numbered position, and a pixel on the right adjacent side of the applicable pixel in one combination image; or when a triple edge of a second pattern was detected in a section centering on a position in the other combination image corresponding to the position where a falling edge was detected between a pixel in an odd-numbered position, and a pixel on the right adjacent side of the applicable pixel in one combination image, wherein the triple edge includes three consecutive edges along a horizontal direction and alternately arrayed as rising edges and falling edges;

wherein the triple edge of the first pattern starts from a rising edge;

wherein the triple edge of a second pattern starts from a falling edge.

4. A video processing method comprising the steps of:

generating and outputting a first combination image by combining images configuring a video sub-divided into odd images having pixels in horizontal odd-numbered positions, and even images having pixels in horizontal even-numbered positions each transmitted by the dual-link system over a first link and a second link as a first link image of odd images and a second link image of even images;

generating and outputting a second combination image by combining the first link image of even images and the second link image of odd images;

detecting horizontal edges in the first combination image and the second combination image; and judging one of either the first combination image or the second combination image as an error image when: a triple edge of a first pattern was detected in a section centering on a position in the other combination image corresponding to the position where a rising edge was detected between a pixel in an odd-numbered position, and a pixel on the right adjacent side of the applicable pixel in one combination image; or when a triple edge of a second pattern was detected in a section centering on a position in the other combination image corresponding to the position where a falling edge was detected between a pixel in an odd-numbered position, and a pixel on the right adjacent side of the applicable pixel in one combination image, wherein the triple edge includes three consecutive edges along a horizontal direction and alternately arrayed as rising edges and falling edges;

wherein the triple edge of the first pattern starts from a rising edge; and wherein the triple edge of a second pattern starts from a falling edge.

* * * * *